(12) United States Patent
Cho

(10) Patent No.: US 6,279,232 B1
(45) Date of Patent: Aug. 28, 2001

(54) APPARATUS FOR REMOVING EGGSHELL

(76) Inventor: Byung-Kwan Cho, Suit 116-813, Yangcheon Apt., Shinjeong-7dong 276, Yangcheon-ku, Seoul (KR)

( * ) Notice: Subject to any disclaimer, the term of this patent is extended or adjusted under 35 U.S.C. 154(b) by 0 days.

(21) Appl. No.: 09/732,599

(22) Filed: Dec. 8, 2000

(30) Foreign Application Priority Data

Dec. 15, 1999 (KR) .................................................. 99-28275

(51) Int. Cl.[7] .............................. A47J 43/00; A47J 43/14; A47J 43/26; A23N 5/00; B26B 17/00
(52) U.S. Cl. ...................... 30/120.1; 30/120.3; 30/120.5; 99/568; 99/572; 99/577; 99/582
(58) Field of Search ............................... 99/495, 537, 568, 99/572–583; 30/120.1, 120.2, 120.3, 120.4, 120.5, 193, 298

(56) References Cited

U.S. PATENT DOCUMENTS

| | | | |
|---|---|---|---|
| 2,543,886 | * 3/1951 | Brookey | 30/120.1 |
| 4,106,402 | 8/1978 | Gevas | 99/571 |
| 4,542,584 | 9/1985 | Talbot | 30/120.1 |
| 4,550,495 | * 11/1985 | Fornes | 30/120.3 |
| 4,582,265 | * 4/1986 | Petronelli | 99/495 X |
| 5,083,508 | 1/1992 | Banks et al. | 99/577 |
| 5,634,272 | * 6/1997 | Samuelson | 30/120.3 |
| 6,041,697 | * 3/2000 | Maoz | 99/572 |

* cited by examiner

Primary Examiner—Timothy F. Simone
(74) Attorney, Agent, or Firm—Mathews, Collins, Shepherd & Gould, P.A.

(57) ABSTRACT

The present invention relates to an apparatus for removing an eggshell, which provides a body and handle for holding an egg softly by linkage between them, a removing plate for breaking the eggshell with the handle, an operating device for expanding the removing plate so as to extract the contents in the egg so that the convenience in removing the eggshell is proposed, the eggshells are removed easily and rapidly, and most of all, the sanitation in removing the eggshell is improved.

4 Claims, 5 Drawing Sheets

APPARATUS FOR REMOVING EGGSHELL

BACKGROUND OF THE INVENTION

1. Field of the Invention

The present invention relates to an apparatus for removing an eggshell, more specifically the apparatus for removing the eggshell, which provides means for removing shell including means for holding an egg softly and breaking a shell thereof with a handle, means for opening a broken eggshell to extract contents therein, and means for adjusting the removing range of the eggshell according to a size of the egg so as to propose the convenience in removing the eggshell and remove the shell of many eggs rapidly.

2. Background of the Related Art

Mostly, a general method for removing an eggshell is to grip an egg with one hand, and then cause the egg to be struck against a rigid object so that the shell is broken.

However, when the eggshell is removed with this method, there are problems in sanitation, since hands become dirty and sometimes a part of the eggshell could be contained within food. In a restaurant, in which a number of eggs are used, to remove the eggshell also requires too much times.

SUMMARY OF THE INVENTION

The present invention is contemplated to solve the aforementioned problem, and it is an object of the present invention to provide an apparatus for removing an eggshell, which proposes the convenience in removing the eggshell and removes the shell of many eggs rapidly.

It is another object of the present to provide an apparatus for removing an eggshell, which improves sanitation in removing the eggshell.

To accomplish the objects, the present inventions provides an apparatus for removing an eggshell comprising: a handle having a opening for pin at an front end and a connecting part in intermediate portion, the handle being connected to a lower portion of a supporting bar extending upwardly using the connecting part with a pin; a body arranged to be parallel to the handle, both front ends thereof being coupled with pin horizontally so that the handle and body operate up and down together, the body having a seat for the egg extending downwardly from the front end thereof and a groove and slot being formed in length direction along with the center of the width of the body; an operating member having a pair of removing plates for expanding and restoring horizontally and a pair of links for expanding and retracting coupled with each corresponding rear ends of the pair of removing plate to form a diamond shape, the operating member including : a first and second slider being coupled with the pair of links and the pair of removing plates respectively at corresponding coupling part, the first and second slider being supported elastically through a spring and movable using each lower ends which is inserted the groove of the body, and a third slider connected to an upper end of the supporting bar and at the same time connected to the second slider through a connecting member, the third slider being movable within the slot of the body; and a cover closing the entire operating member exclusive of the removing plates and mounted on an upper part of the body.

In the preferred embodiments, a projection and spring loading space formed therein are located at a rear end of the body and a spring is mounted between the projection and the third slide.

Preferably on the cover a recess is formed and an adjusting member for adjusting an initiation point for horizontal expansion of the pair of removing plates, is inserted in the recess.

More preferably, The adjusting member has an adjusting plate, which is mounted to the shaft end of the adjusting member and includes at least three sunken portions formed around the adjusting plate, wherein the horizontal expansion of the removing plates initiates at the position where the first slider could not move further by being entrapped in any one of the sunken portions.

BRIEF DESCRIPTION OF THE DRAWINGS

The features and advantages of the present invention will be more described specifically in the following description of preferred embodiments of the invention with reference to the accompanying drawings wherein.

DETAILED DESCRIPTION OF THE PREFERRED EMBODIMENT

Figure 1:
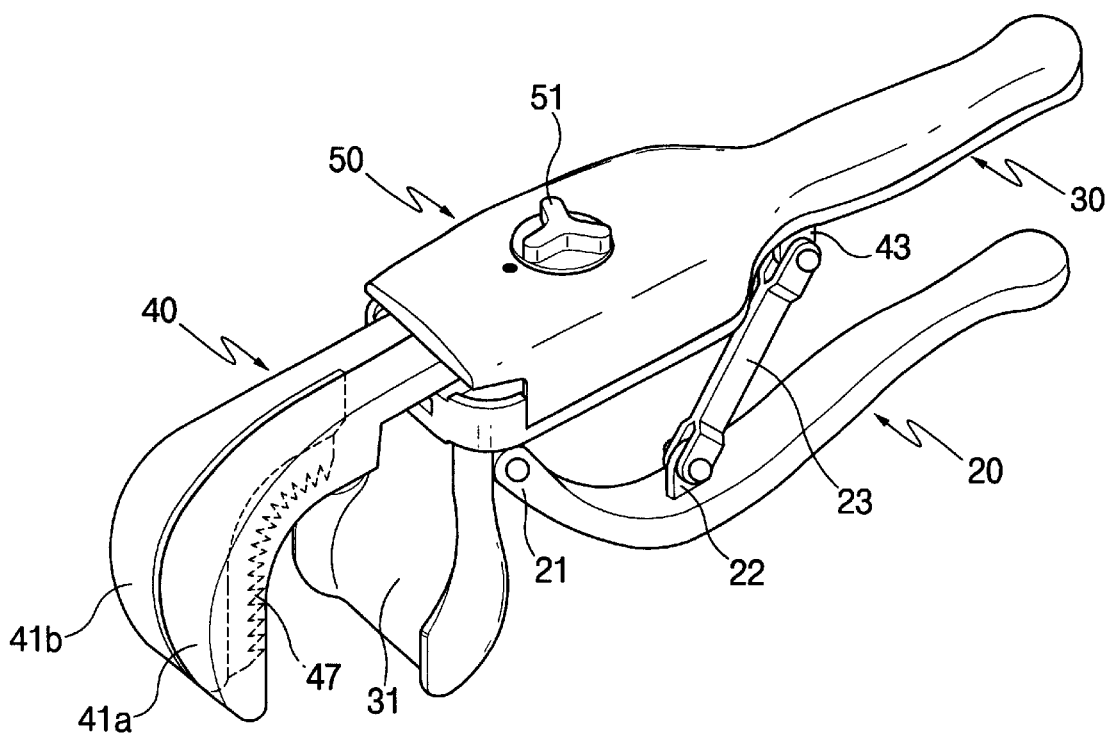
FIG. 1 is an assembled perspective view of an apparatus for removing an eggshell according to the present invention.

Reference will now be made in detail to the preferred embodiments of the present invention, examples of which are illustrated in the accompanying drawings. In explaining the present invention, the same names and reference numerals will be given to the same components, and explanations in the same will be omitted.

An apparatus for removing an eggshell according to the present invention comprises handle and body for operating the removing apparatus itself, a operating member for removing the eggshell substantially, and a cover for closing the removing apparatus, wherein the egg is located between a egg seat of the body and a removing plate of the operating member, and the body is gripped and released together with the handle so that the eggshell is removed easily. Referring to the drawings, the apparatus according to the present invention will be explained in detail.

Figure 2:
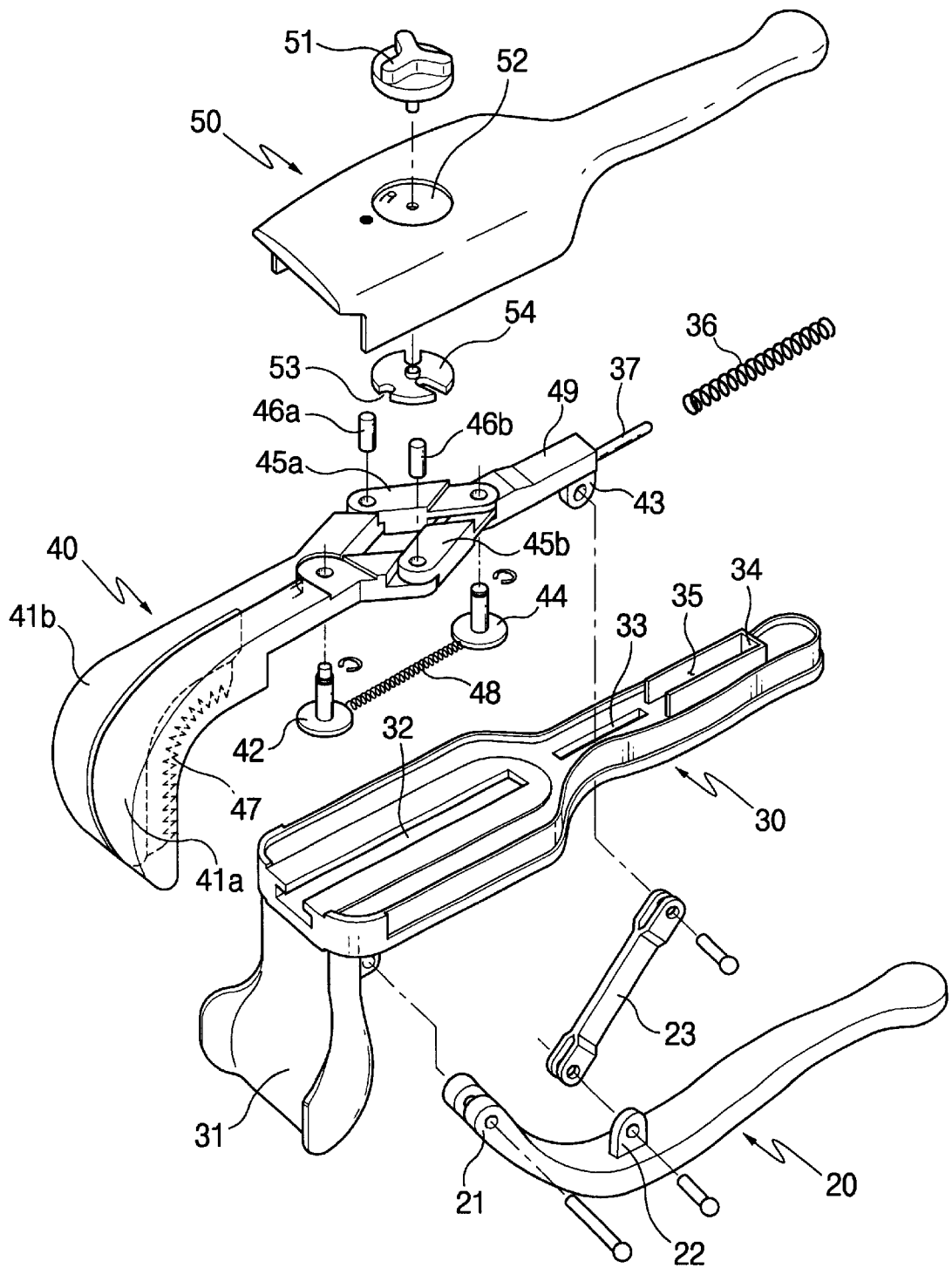
FIG. 2 is an exploded perspective view of an apparatus for removing an eggshell according to the present invention.

FIG. 1 is an assembled perspective view of apparatus for removing eggshell according to the present invention, and FIG. 2 is an exploded perspective view of apparatus for removing eggshell according to the present invention.

As illustrated in FIG. 1 and FIG. 2, an opening 21 is formed at a front end of a handle 20, so that the handle 20 is coupled to be operatable using the opening 21 and a pin.

Also, the handle 20 is formed to have a predetermined length so that finger could be laid thereon, and a connecting part 22 for a supporting bar is formed at an intermediate part of the handle 20 so that a lower end of the supporting bar 23 is connected to the connection part 20 with a pin.

An upper end of the supporting bar 23 is installed to be inclined backward slightly, and the connection part 22, to which the lower end of the supporting part 23 is connected has a height to exclude the interference with an upper surface of the handle 20 in the operation of the supporting bar.

Entirely, a body 30 is arranged to be parallel to the handle 20, and then each front end thereof are coupled with pin so that the handle 20 and body 30 operate up and down together around the pin-coupled front ends.

Additionally, a seat 31 for the egg extends from the front end of the body 30 vertically and downwardly, so that a part of the egg could be shrouded and supported.

And, a groove 32, which is opened upwardly and has a T-shaped section, is formed in length direction at the center of the width of the body 30 so that a first slider 42 and second slider, which described below could be guided therein, and apart from the groove 32, a slot 33 in line is formed so that a third slider 43 described below could be guided therein.

The groove 32 enables the installation of the first and second slider 42,44 by its opened front end.

A projection 34 and spring loading space 35 formed to have a predetermined length by the projection 34 are located in an upper surface of a rear end in the body so that allows a spring 36 restoring the body 20 and supporting bar 23 to be contained therein with one end supported.

An operating member 40 removes the eggshell substantially, and comprises a pair of removing plates 41a, 41b for supporting a part of egg, which is opposite to the part supported by the seat 31 of the body 30, a pair of links 45a, 45b for expanding and restoring the pair of removing plate 41a, 41b horizontally, at least two sliders 42,44 and spring 48 for expanding and retracting the pair of links 45a,45b, and a slider 34 and connecting member 49 for moving all of them mentioned above horizontally.

In the pair of removing plate 41a, 41b, a front end thereof is formed to be bent downwardly in order to be faced with the seat 31 of the body 30, and each rear end extends diagonally from the coupled part thereof to ensure a space in which each rear end could be gathered.

Each front end of the pair of links 45a, 45b is coupled with each corresponding rear ends of the pair of removing plate 41a, 41b by pins 46a, 46b, with rear ends of links being coupled by pin, and thus the pair of links 45a, 45b and the pair of removing plate 41a, 41b are disposed to form a diamond shape.

Especially, the pair of removing plates 41a, 41b has a part contacting each other, where sawteeth 47 are exist respectively to break the eggshell directly.

The first and second slider 42, 44 are coupled with the pair of links 45a, 45b and the pair of removing plates 41a, 41b respectively at corresponding through hole for pin coupling in order to be a rotation axes on their moving.

Additionally, the first and second slider 42, 44 are supported elastically through the spring 48, and movable using each lower ends that is inserted into the groove 32 of the body 30.

With this movement of the first and second slider 42, 44, the pair of links 45a, 45b and the pair of removing plate 41a, 41b coupled therewith could be movable together.

The third slider 43 moves within the slit 33 of the body 30, and at the same time draws all of the first and second slider 42, 44, the pair of links 45a, 45b, and the pair of removing plate 41a, 41b backward by means of the connecting member 49 connected to the second slider 44.

For this, the third slider 43 is also connected to the upper end of the supporting bar 23 that is installed on the handle 20, and thereby causes the connecting member 49 and associated components such as the pair of links 45a, 45b and the like to slide backward by the supporting bar 23, which moves together with the handle 20 operation.

The connecting member 49 is coupled together with the pair of links 45a, 45b by the second slider 44 actually.

Particularly, between the rear portion of the third slider 43 and the projection 34, the spring 36 is inserted, and using this the supporting bar 23 and the handle 20 are restored to the original position on releasing the handle 20.

In this restoring structure, it is preferable that the spring 36 in operation is guided by guider 37 which extends from the rear of the connecting member 49.

A cover 50 is a member which closes the entire operating member 40 exclusive of the removing plates 41a, 41b, locates on the body 30, and has a shape similar to the body 30.

Also, on the cover 50 a recess 52 is formed, in which adjusting member 51 is mounted so that a shaft of the adjusting member 51 penetrates into the center of the recess 52. To the shaft end of the adjusting member 51, an adjusting plate 54 limiting the amount of the movement of the first slider 42, is mounted to be rotatable with the adjusting member 51.

The adjusting plate 54 is in the moving path of the first slider 42 and has at least three sunken portion 53, which are formed around the adjusting member 51 with a certain distance and different each other in size, and thereby the movement of the first slider 42 is limited by being entrapped in any one of the sunken portion 53 selected.

That is, as the adjusting member 51 is mounted in the recess 52, the adjusting plate 54 mounted to shaft end of the adjusting member 51 locates in the moving path of the first slider 42, and the upper portion of the first slider 42 moving backward according to the operating of the handle 20, could be entrapped in the sunken part 53 of the adjusting plate 54. From this, the pair of the links 45a, 45b initiates to be expand and retract and at the same time the pair of the removing plates initiates to operate accordingly.

The operation of the apparatus for removing the eggshell according to the present invention will be explained as follows.

Figure 3A:
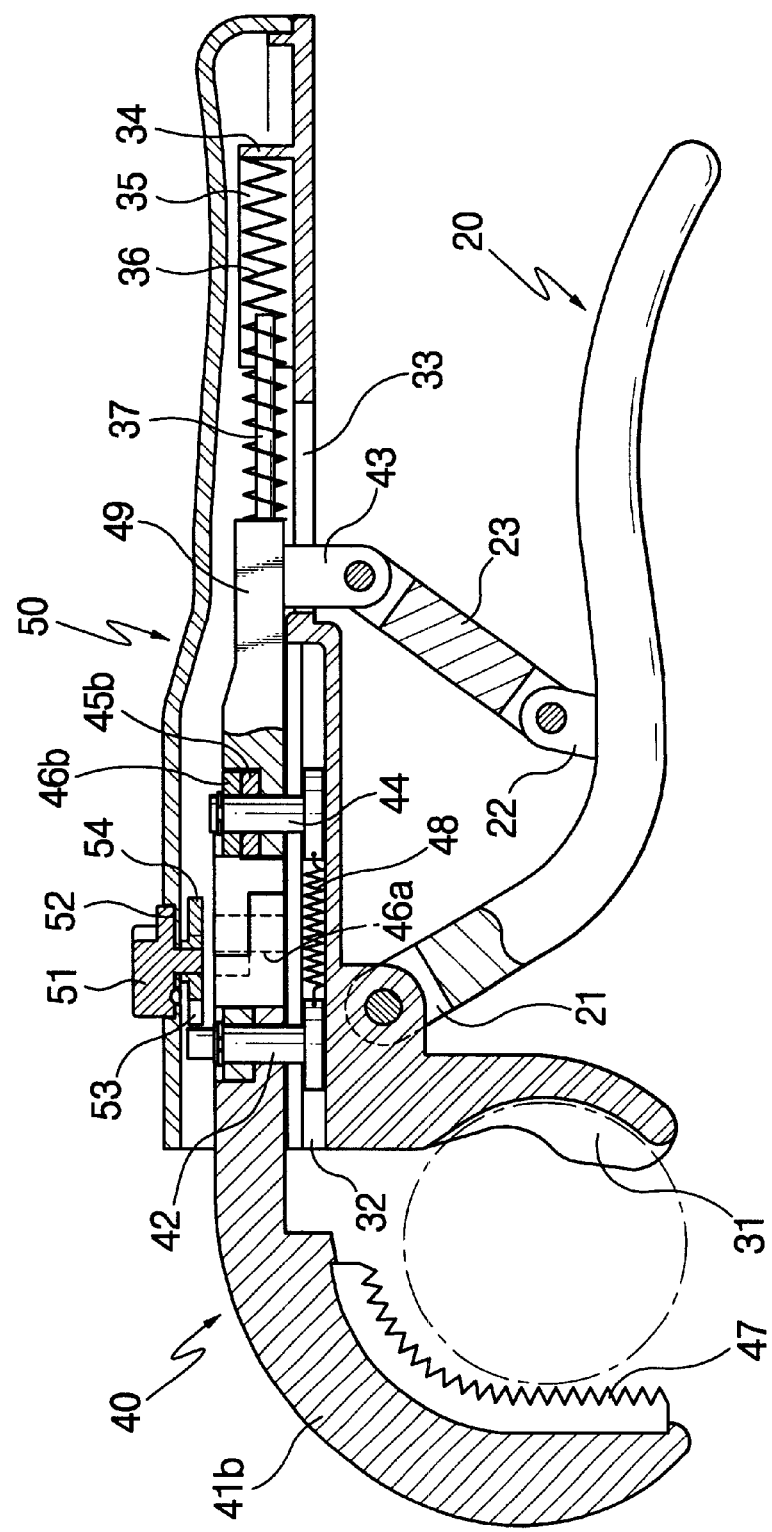
FIG. 3a, 3b are a sectional view illustrating the operation of an apparatus for removing an eggshell according to the present invention.
Figure 3B:
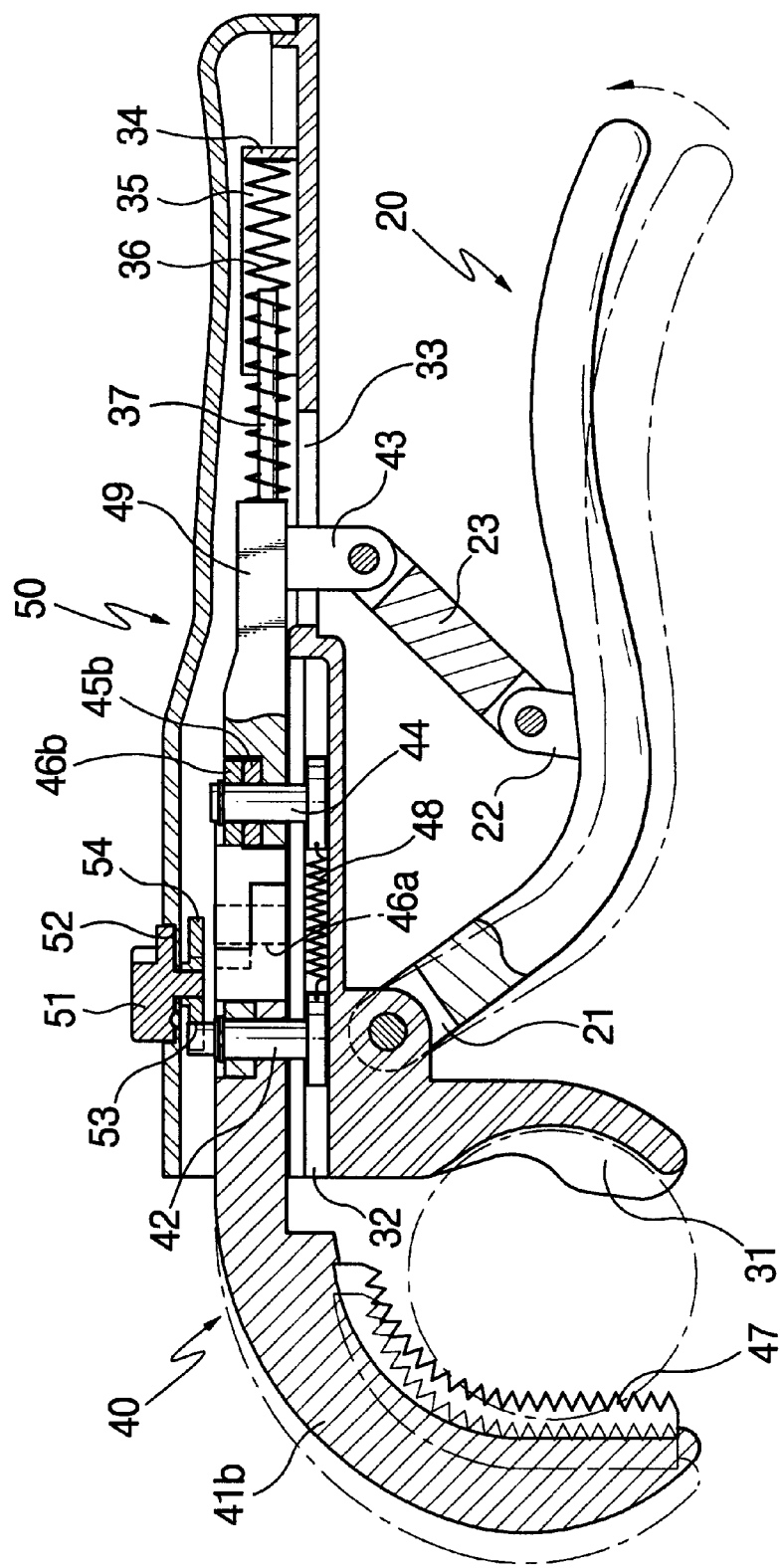
Figure 4:
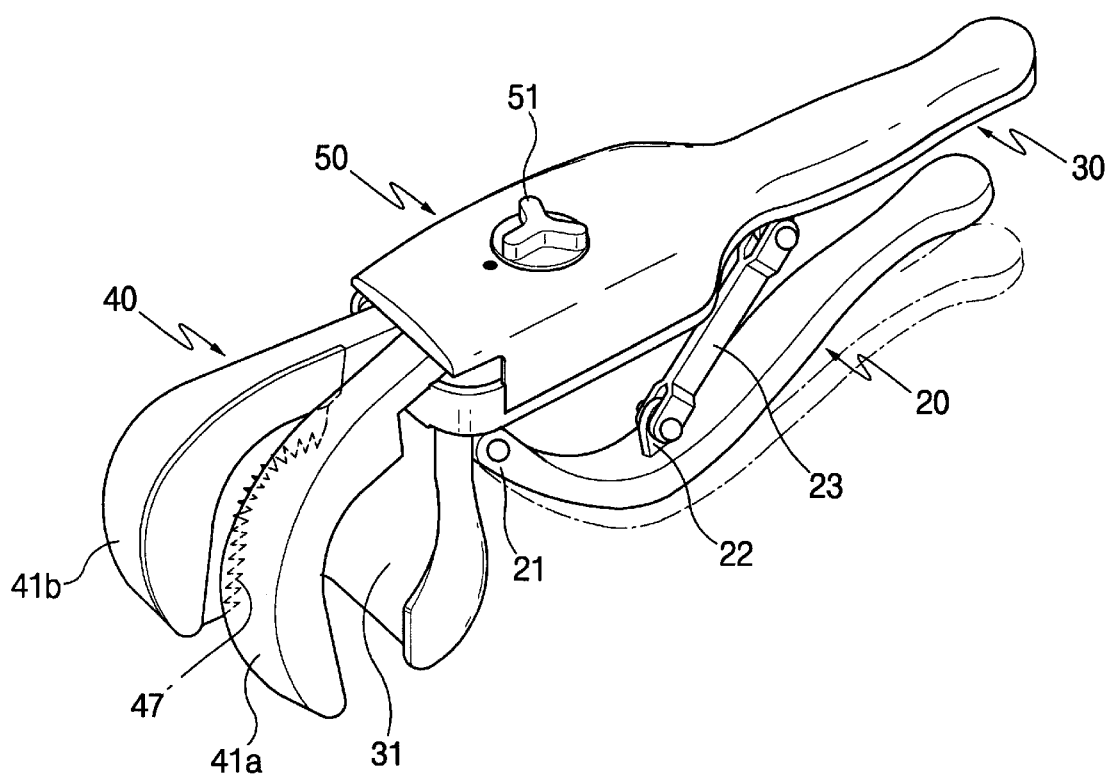
FIG. 4 is a perspective view illustrating removing plate expanded of the present invention.

FIG. 3a and FIG. 3b are a sectional view illustrating the operation of apparatus for removing eggshell according to the present invention, and FIG. 4 is a perspective view illustrating opened removing plates.

As illustrated in FIG. 3a, firstly the handle 20 and the rear part of the body 30 are gripped by the hand softly, and then the egg is located between the seat 31 and the removing plates 41a, 41b.

When the handle 20 is gripped more tightly as illustrated FIG. 3b, the upper end of the supporting bar 23 draws back by linkage between the handle 20 and the body 30.

At the same time, the third slider 43 connected to the upper end of the supporting bar 23, compresses the spring 36 and moves backward along the slit 33, And, the second slider 44, the first slider 42, the pair of links 45a, 45b, and removing plates 41a, 41b all of which are associated with the connecting member 49, move backward to the distance which the third slider moves, and cause the removing plate located the front end thereof to press the egg.

Then, the egg is pressed between the removing plate 41a, 41b and the seat 31, and the eggshell is broken by the sawteeth 47 in the removing plates 41a, 41b as the handle 20 is gripped more tightly at that position.

As the handle 20 is gripped more tightly in the eggs shell breaking, by the adjusting plate 54 of the adjusting member 51 which is mounted in the recess 52 of the cover 50, the first slider 42 entrapped therein could not move further, and the removing plate 41a, 41b associated with the first slider 42 could not move backward as well, and then only the second slider 44 is drawn according to the movement of the third slider 43.

Consequently, as the second slider 44 is drawn, both of links 45a, 45b move inwardly and at the same time the rear ends of the removing plate 41a, 41b coupled to the links 45a, 45b move inwardly. Therefore, since the pair of removing plates 41a, 41b holding each of an eggshell broken in half, as shown in FIG. 4, expands, the contents therein could be extracted to be able to be stored in a container.

After removing the eggshell, as the handle 20 is released, with the two restoring means, that is the spring 48 restoring the expanded removing plates 41a, 41b and the spring 36 restoring the third slider 43, the apparatus for removing the eggshell is restored entirely.

Meanwhile, with the simple adjustment of the member 51, a various size of the eggshell could be removed.

More specifically, since according the rotation of the adjusting member, the different sunken portion of the adjusting plate 54 in size engages with the first slider 42, thereby the position of expanding in the removing plate 41a, 41b could be changed, the eggshell could be removed easily regardless of its size.

As described above, The present invention provides means for removing shell including means for holding an egg softly and breaking a shell thereof with a handle, means for opening a broken eggshell to extract contents therein, and means for adjusting the removing range of the eggshell according to a size of the egg so that the convenience in removing the eggshell is proposed, the eggshells are removed easily and rapidly, and most of all, the sanitation in removing the eggshell is improved.

Although a number of embodiment have described in the above specification, it should be apparent that the present invention could be embodied in many other specific mode included within the sprit and scope of the present invention. Thus, the present embodiments should be considered as illustrative, and the present invention could be modified within the scope of claims and the equivalent thereof.

What is claimed is:

1. An apparatus for removing an eggshell comprising:

a handle having a opening for pin at an front end and a connecting part in intermediate portion, the handle being connected to a lower portion of a supporting bar extending upwardly using the connecting part with a pin;

a body arranged to be parallel to the handle, both front ends thereof being coupled with pin horizontally so that the handle and body operate up and down together, the body having a seat for the egg extending downwardly from the front end thereof and a groove and slot being formed in length direction along with the center of the width of the body;

an operating member having a pair of removing plates for expanding and restoring horizontally and a pair of links for expanding and retracting coupled with each corresponding rear ends of the pair of removing plate to form a diamond shape, the operating member including:

a first and second slider being coupled with the pair of links and the pair of removing plates respectively at corresponding coupling part, the first and second slider being supported elastically through a spring and movable using each lower ends which is inserted the groove of the body, and a third slider connected to an upper end of the supporting bar and at the same time connected to the second slider through a connecting member, the third slider being movable within the slot of the body; and a cover closing the entire operating member exclusive of the removing plates and mounted on an upper part of the body.

2. An apparatus according to claim 1, wherein a projection and spring loading space formed therein are located at a rear end of the body and a spring is mounted between the projection and the third slide.

3. An apparatus according to claim 1, wherein on the cover a recess is formed and an adjusting member for adjusting an initiation point for horizontal expansion of the pair of removing plates, is inserted in the recess.

4. An apparatus according to claim 3, wherein the adjusting member has an adjusting plate, which is mounted to the shaft end of the adjusting member and includes at least three sunken portions formed around the adjusting plate, wherein the horizontal expansion of the removing plates initiates at the position where the first slider could not move further by being entrapped in any one of the sunken portions.

* * * * *